United States Patent [19]

Kawatra et al.

[11] Patent Number: 4,997,533

[45] Date of Patent: Mar. 5, 1991

[54] PROCESS FOR THE EXTRACTING OXYGEN AND IRON FROM IRON OXIDE-CONTAINING ORES

[75] Inventors: Surendra K. Kawatra; Timothy C. Eisele, both of Houghton, Mich.

[73] Assignee: Board of Control of Michigan Technological University, Houghton, Mich.

[21] Appl. No.: 389,955

[22] Filed: Aug. 7, 1989

[51] Int. Cl.[5] .............................................. C25C 1/06
[52] U.S. Cl. ................................... 204/113; 204/128; 204/129
[58] Field of Search ............... 204/128, 129, 242, 112, 204/113; 423/481, 486, 488, 487

[56] References Cited

U.S. PATENT DOCUMENTS

| | | |
|---|---|---|
| 1,420,128 | 5/1919 | Moxham . |
| 1,420,129 | 5/1919 | Moxham . |
| 2,441,856 | 5/1948 | Turner et al. .......................... 23/202 |
| 3,410,770 | 11/1968 | Buechler .............................. 204/129 |
| 3,529,931 | 9/1970 | Moklebust ............................ 23/154 |
| 4,060,464 | 10/1977 | Fahlstrom et al. ................. 204/113 |
| 4,180,555 | 12/1979 | Bamberger et al. ................ 423/481 |
| 4,230,542 | 10/1980 | Traini et al. ......................... 204/93 |

*Primary Examiner*—John F. Niebling
*Assistant Examiner*—Kathryn Gorgos
*Attorney, Agent, or Firm*—Michael, Best & Friedrich

[57] ABSTRACT

Oxygen and metallic iron are produced from an iron oxide-containing mineral, such as ilmenite, by extracting iron from the mineral with hydrochloric acid, separating solid residue from the resulting solution and drying same, electrolyzing the separated, iron chloride-containing solution to produce electrolytic iron and chlorine gas, combining the chlorine gas with water recovered from the drying and/or iron chloride-containing solution electrolysis steps of regenerate hydrochloric acid and recycling the hydrochloric acid to the extraction step. In an alternate embodiment, the chlorine gas is reacted with recovered water in the presence of a catalyst to produce hydrochloric acid which is recycled to the extraction step, thereby eliminating the need for water electrolysis and a separate hydrochloric acid regeneration step. In another alternate embodiment, electrolysis of the iron chloride-containing solution is operated to produce oxygen instead of chlorine gas at the anode and hydrochloric acid is generated concurrently with plating of iron at the cathode. This hydrochloric acid is recycled to the extraction step, thereby eliminating the need for water electrolysis and a separate hydrochloric acid regeneration step.

11 Claims, 1 Drawing Sheet

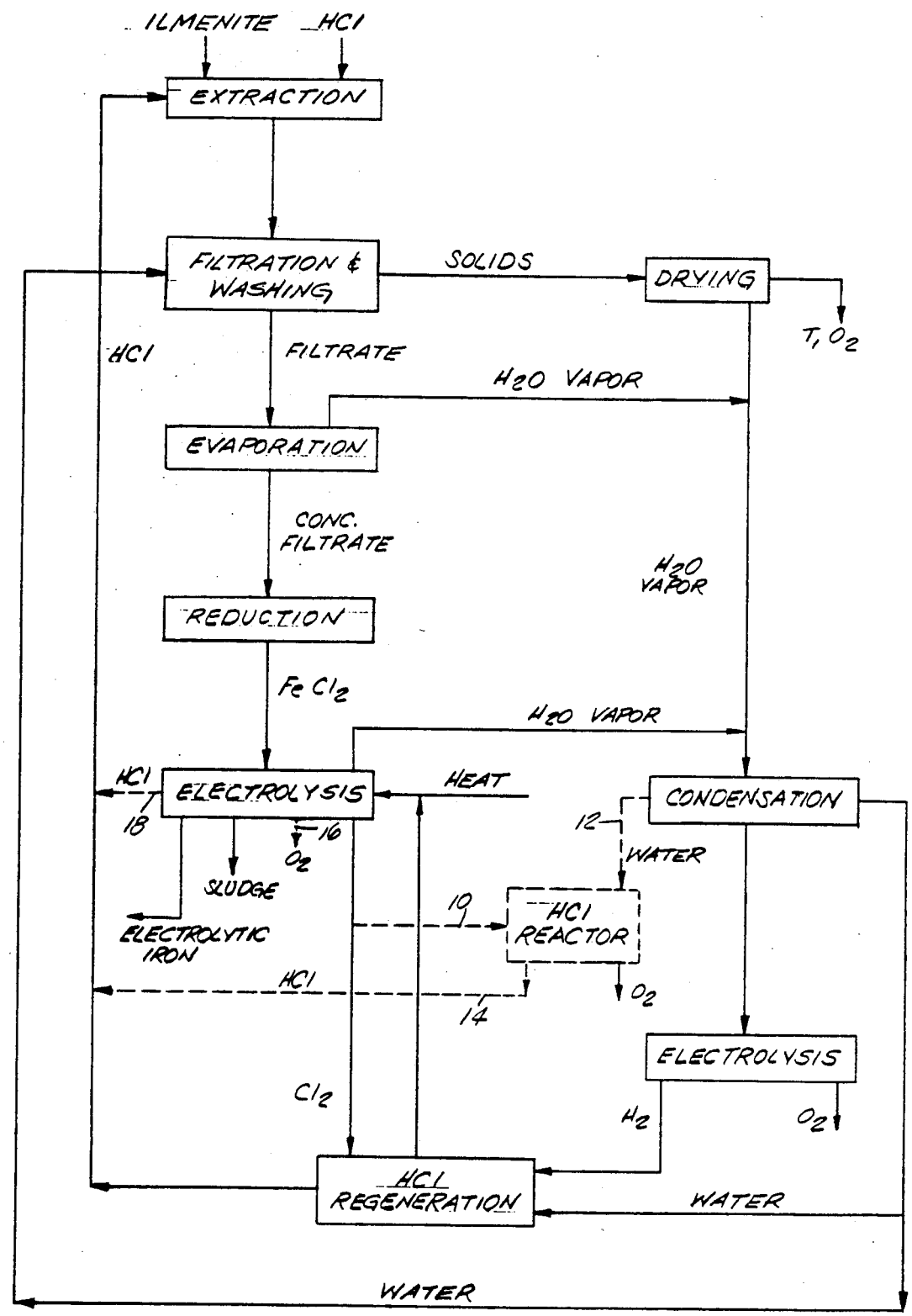

PROCESS FOR THE EXTRACTING OXYGEN AND IRON FROM IRON OXIDE-CONTAINING ORES

BACKGROUND OF THE INVENTION

This invention relates to processes for extracting oxygen and metallic iron from iron oxide-containing ores such as ilmenite and, more particularly, to such processes which can be used at lunar or other space station installations.

Many prior techniques for extracting oxygen and metallic iron from lunar rocks, such as hydrogen reduction or carbothermal reduction of ilmenite or electrowinning of molten silicates, require temperatures in excess of 900° C. Such techniques are not practical for many applications because they require refractory materials and heavy insulation which results in high construction costs for full scale installations and operational costs are quite high, particularly energy costs. Also, the only useful material directly produced by the hydrogen reduction of ilmenite is gaseous oxygen.

U.S. Pat. No. to Turner et al, U.S. Pat. No. 2,441,856 discloses a cyclical process for producing titanium dioxide from ilmenite. However, that process is designed primarily for recovering titanium dioxide pigments and does not produce oxygen.

U.S. Pat. No. 1,420,128 to Moxham, U.S. Pat. No. 1,420,129 to Moxham and U.S. Pat. No. to Fahlstrom et al, U.S. Pat. No. 4,060,464 disclose processes for extracting iron from iron-bearing ores and recovering iron by electrolysis. U.S. Pat. No. 3,529,931 to Moklebust discloses a process for regenerating hydrochloric acid from an iron chloride solution derived from leaching a titaniferous ore, such as ilmenite. U.S. Pat. No. to Traini et al, U.S. Pat. No. 4,230,542 discloses an electrolytic process for treating a hydrochloric acid ilmenite leach solution to reduce ferric ions to ferrous ions.

SUMMARY OF THE INVENTION

A principal object of this invention is to provide a low-temperature, low-pressure process for producing elemental oxygen and metallic iron in usable form from an iron oxide-containing mineral, particularly ilmenite.

Another object of the invention is to provide such a process in which the reagents used for extraction are regenerated, thereby reducing the quantity of materials consumed by the process.

A further object of the invention is to provide such a process which can be operated with relatively low voltage DC power capable of being conveniently generated by solar cells, nuclear reactors and the like.

A still further object of the invention is to provide such a process which is practical for use at a lunar base or other space station installation.

Other objects, aspects and advantages of the invention will become apparent to those skilled in the art upon reviewing the following detailed description, the drawing and the appended claims.

The invention provides a process for recovering oxygen and metallic iron from an iron oxide-containing mineral, such as ilmenite, including the stes of (a) contacting the mineral in finely divided form with water and hydrochloric acid, hydrogen chloride or mixtures thereof to dissolve hydrochloric acid-soluble iron in the material, (b) separating the insoluble, solid residue from the resulting solution, (c) drying the separated solid residue, (d) reducing ferric chloride in the separated solution to ferrous chloride and adjusting the pH of the separated solution to a level suitable for electrolysis, (e) electrolyzing the reduced and pH-adjusted solution under conditions which produce chlorine gas and metallic iron, (f) condensing water vapors recovered from one or both of the drying and electrolysis steps, (g) electrolyzing the condensed water to produce elemental oxygen and hydrogen, and (h) combining the chlorine gas from the first electrolysis step with the hydrogen from the second electrolysis step and water to form hydrochloric acid and (i) recycling the hydrochloric acid to step (a).

In one embodiment, steps (g) through (i) are replaced with the steps of (j) reacting the chlorine gas from the first electrolysis step with a condensed water in the presence of a catalyst to produce hydrochloric acid and oxygen and (k) recycling the hydrochloric acid to step (a).

In another embodiment, the first electrolysis is carried out under conditions to produce metallic iron and oxygen, the concentration and pH of the solution undergoing electrolysis is maintained within predetermined ranges by controlling the amount of water and hydrogen chloride vapor evaporated from the solution and water and hydrogen chloride vapors recovered from the first electrolysis step are recycled to step (a).

BRIEF DESCRIPTION OF THE DRAWING

The single FIGURE is a flow diagram of a process embodying the invention.

DETAILED DESCRIPTION

The process of the invention can be used with a variety of iron oxide-containing minerals, particularly titaniferous ores. It is particularly adaptable for use with ilmenite, an ore found on the moon and other potential sites for space stations, and will be described in connection with that application.

Referring to the flow diagram, it can be seen that the process Produces primarily three end products: oxygen, electrolytic iron and a titanium dioxide-rich solid waste product. In addition, under some conditions, a sludge containing salts such as calcium chloride, may be produced during the first electrolysis step. This sludge contains the bulk of the chlorine values lost from the process.

The initial step in the process is extraction of ilmenite with hydrochloric acid. During start up, finely divided ilmenite ore is treated with fresh, concentrated hydrochloric acid to dissolve the iron in the ilmenite. As described in more detail below, while the process is being carried out, water and hydrochloric acid, hydrogen chloride vapors and mixtures thereof are recycled from various points in the process as the primary source of the extractant and fresh hydrochloric acid is added to make up for losses.

The amount of hydrochloric acid used preferably is sufficient to substantially dissolve all the hydrochloric acid-soluble iron in the ilmenite. The amount of hydrochloric acid used most preferably is in excess of that theoretically required to dissolve all the hydrochloric acid-soluble iron. After start up, the concentration of the hydrochloric acid used in the extraction step preferably should be at least about 10% for an efficient operation.

The extraction can be carried out in any suitable manner, such as under a reflux or a countercurrent treatment. It preferably is carried out at an elevated temperature greater than about 30° C. in order to obtain a rapid dissolution of the iron.

The extraction process produces a solution containing primarily ferric chloride, ferrous chloride, water and unreacted hydrochloric acid and a solid residue consisting primarily of titanium dioxide and residual iron oxide. Small amounts of other salts may be present in the solution, and the solid residue usually will contain some silicate and aluminate compounds.

The insoluble, solid residue is separated from the solution in a suitable manner, such as by filtration or sedimentation. The separated solid residue preferably is washed at least once with fresh water to remove residual solution and thereby reduce the loss of chlorine values with the solid residue. The wash water is combined with the solution from the separation step.

The washed solid residue is thermally dried to recover residual wash water and drive off any volatile chlorides present. The dried residue can be either disposed as waste or used as a feedstock for a titanium extraction process.

Prior to electrolysis, the solution and wash water from the separation step are treated in a suitable manner, such as evaporation, to remove excess water and hydrochloric acid and adjust the PH and iron chloride concentration to appropriate levels for electrolysis. The pH of the solution should be less than about 4, preferably about 0.5 to about 1, for electrolysis.

The solution from the separation step contains significant amounts of ferric chloride which must be reduced to ferrous chloride before electrolysis. This may be accomplished by any suitable technique, such as by reacting the solution with metallic iron. Electrolytic iron produced during the electrolysis step can be used for this purpose. In another suitable technique, ferric chloride can be reduced to ferrous chloride electrochemically.

While the solution evaporation and the reduction steps are shown separately in the flow diagram, they all can be performed in the electrolytic cell used for electrolysis.

The electrolysis is carried out in a suitable electrolytic cell, such as one including a graphite anode and an iron plate cathode. In a preferred embodiment illustrated by solid lines in the flow diagram, the electrolytic cell is operated under conditions which liberates chlorine gas at the anode and deposits electrolytic iron at the cathode. The electrolytic iron has a high purity, and after heat treating and forming, can be used for a variety of applications. As mentioned above, a portion can be reacted with the solution from the separation step to reduce ferric chloride to ferrous chloride.

When the process is used at lunar or space station installations, the electrolytic cell can be operated with relatively low DC voltage (e.g., about 1.5 to about 10 volts) and a current density of about 0.025 to about 1 A/cm$^2$. The power for the electrolytic cell can be produced by solar cells, nuclear reactors or the like.

In some cases, various salts, such as calcium chloride, may be formed from the solution during electrolysis. These salts, which comprise the bulk of the chlorine losses from the process, can be removed from the solution in a suitable manner such as by precipitation as a sludge or vacuum crystallization.

The contents of the electrolytic cell can be heated to improve electrolysis efficiency and also to evaporate excess water and thereby maintain the ferrous chloride concentration at a predetermined level desired for electrolysis. Generally, a temperature of about 30 to about 90° C. is suitable for this purpose.

Water vapor recovered from the drying step, the evaporation step and/or the electrolysis step is condensed in a suitable condensation device. Portions of this water are used for washing and regenerating hydrochloric acid as explained in more detail below. The excess water is electrolyzed in a conventional electrolytic cell to produce hydrogen and oxygen.

The chlorine gas from the first electrolysis step and the hydrogen from the second electrolysis step are combined in a suitable manner to regenerate hydrochloric acid. This regeneration can be carried out by burning the hydrogen with chlorine and combining with a portion of the recovered water or by a photochemical reaction under the influence of sunlight in the presence of a suitable catalyst and a portion of the recovered water. Heat evolved during the hydrochloric acid regeneration can be used in the first electrolysis step or the residue drying step.

When the process is used for extraterrestrial applications, there obviously will be a shortage of various reagents. Consequently, regeneration and reuse of hydrogen and chlorine are extremely important. As illustrated in the flow diagram, this is accomplished by washing the solid residue thoroughly to remove as much residual chlorides as possible, recovering water vapor from the drying and evaporation steps, recovering water vapor and volatile chlorides from the first electrolysis step and employing two recycle streams. One stream contains a hydrochloric acid solution of a sufficient concentration to extract iron from ilmenite and is recycled to the extraction step. The other stream contains water or a very weak hydrochloric acid solution in water and is recycled for washing the solid residue from the separation step. The use of the these recycle streams provides a highly efficient recovery of reagents and minimizes the loss of hydrogen and chlorine.

In an alternate embodiment illustrated by dashed lines 10, 12 and 14 in the flow diagram, the chlorine gas produced during the first electrolysis step is reacted with recovered water in the presence of a suitable catalyst to produce a hydrochloric acid solution and oxygen. The hydrochloric acid solution is recycled to the extraction step as in the embodiment described above. While the reaction may be somewhat slower, this alternate approach eliminates the need to electrolyze water and also the need for a separate step to regenerate hydrochloric acid.

In another alternate embodiment illustrated by dashed lines 16 and 18 in the flow diagram, the electrolysis of the ferrous chloride solution is operated in a manner to produce oxygen at the anode rather than chlorine gas. This results in hydrogen chloride being generated concurrently with plating of iron on the cathode. This hydrogen chloride can be combined with water as illustrated and recycled directly from the electrolytic cell to the extraction step, thereby eliminating the need for the water electrolysis step and a separate hydrochloric acid regeneration step.

The process can be operated at temperatures below 100° C. and pressures less than one atmosphere and yet obtain high extraction efficiency for both iron and oxygen from ilmenite. This reduces energy costs and eliminates the need for refractory materials and/or heavy insulation with a resultant reduction in construction costs. Oxygen and iron are materials needed for lunar and other space station installations. Also, the process can be operated with low voltage DC power which can be conveniently provided by solar cells, nuclear reactors and the like, thereby making it well suited for lunar and space applications.

Without further elaboration, it is believed that one skilled in the art can, using the preceding description, utilize the present invention to its fullest extent. The following example is presented to exemplify the invention and should not be construed as a limitation thereof.

EXAMPLE

Laboratory tests were run with an iron oxide-containing mineral to verify the feasibility of the hydrochloric leaching and the ferrous chloride electrolysis steps. Leaching was carried out with concentrated hydrochloric acids solutions at 30° C. Samples were taken at 30 minute intervals, and it was found that the bulk of the soluble iron was dissolved within the first 30 minutes of leaching.

Electrolysis was carried out with a concentrated ferrous chloride at pH=0.5 and 40° C. and using a copper plate cathode and a graphite anode encased in a cloth bag to prevent electrooxidation of dissolved iron. The electrolysis was operated at 4.5 volts with a cathode current density of 0.008 A/cm$^2$ for 12 hours. This voltage is substantially higher than the theoretical value of 1.0 volt, so a considerable quantity of hydrogen was evolved and cathode efficiency for iron deposition was reduced to 30%. Copious amounts of chlorine were produced at the anode, as expected. It is believed that, with routine experimentation, iron deposition can be substantially increased and oxygen produced during iron electrolysis.

From the foregoing description, one skilled in the art can easily ascertain the essential characteristics of the invention and, without departing from the spirit and scope thereof, make various changes and modifications to adapt it to various usages.

We claim:

1. A process for producing oxygen and metallic iron from an iron oxide-containing mineral comprising the steps of:
   (a) contacting the mineral in finely divided form with water and hydrochloric acid, hydrogen chloride vapors or a mixture thereof to dissolve hydrochloric acid-soluble iron in the mineral and produce a solution containing an insoluble solid residue;
   (b) separating the insoluble solid residue from the solution formed in step (a);
   (c) drying the insoluble solid residue from step (b) and collecting water vapor separated from the insoluble solid residue;
   (d) reducing ferric chloride in the separated solution to ferrous chloride and adjusting the pH of the separated solution to a level suitable for electrolysis;
   (e) electrolyzing the reduced and pH-adjusted solution from step (d) under conditions to produce metallic iron, chlorine gas and water vapor;
   (f) condensing water vapor recovered from one or both of steps (c) and (e);
   (g) electrolyzing the water from step (f) to produce oxygen and hydrogen;
   (h) combining chlorine gas from step (e) with hydrogen from step (g) and water to produce hydrochloric acid; and
   (i) recycling hydrochloric acid from step (h) to step (a).

2. A process according to claim 1 wherein the amount of hydrochloric acid employed in step (a) is at least sufficient to dissolve substantially all of the hydrochloric acid-soluble iron in the material.

3. A process according to claim 1 wherein the iron oxide-containing mineral is ilmenite.

4. A process according to claim 1 wherein a portion of the water from step (f) is used in step (h).

5. A process according to claim 1 wherein the separated solid residue is washed with water prior to step (c) to produce a wash water which is combined with the solution from step (b).

6. A process according to claim 5 wherein a portion of the water from step (f) is used to wash the separated solid residue.

7. A process according to claim 1 wherein steps (g) through (i) are replaced by the steps of:
   (j) reacting the chlorine gas from step (e) with water from (f) where a catalyst is present to produce hydrochloric acid and oxygen; and
   (k) recycling the hydrochloric acid from step (j) to step (a).

8. A process according to claim 1 wherein step (a) is carried out by countercurrently contacting the mineral with water and hydrochloric acid, hydrogen chloride vapors or mixtures thereof.

9. A process according to claim 1 wherein ferric chloride in the separated solution from step (b) is reduced to ferrous chloride by adding metallic iron from step (e) to the separated solution.

10. A process according to claim 1 wherein electrolysis of the reduced and pH-adjusted solution is carried out in an electrolytic cell having an anode and a cathode and under conditions whereby both hydrogen and metallic iron are produced at the cathode, ferric chloride is reduced to ferrous chloride in the electrolytic cell and the amount of hydrogen being produced is controlled to maintain the solution in the electrolytic cell at a predetermined pH.

11. A process for producing oxygen and metallic iron from an iron oxide-containing mineral comprising the steps of:
   (a) contacting the mineral in finely divided form with water and hydrochloric acid, hydrogen chloride vapors or a mixture thereof to dissolve hydrogen acid-soluble iron in the mineral and produce a solution containing an insoluble residue;
   (b) separating the insoluble, solid residue from the solution formed in step (a); p1 (c) reducing ferric chloride in the separated solution from step (b) to ferrous chloride and adjusting the pH of the separated solution to a level suitable from electrolysis and recovering water separated;
   (d) introducing the separated solution into an electrolytic cell having an anode and a cathode and electrolyzing the solution therein under conditions to produce metallic iron and hydrogen chloride at the cathode, oxygen at the anode and water vapor;
   (e) condensing water vapor recovered from step (d); and
   (f) combining hydrogen chloride from step (d) with water from step (c) and recycling same to step (a).

* * * * *

UNITED STATES PATENT AND TRADEMARK OFFICE
CERTIFICATE OF CORRECTION

PATENT NO. : 4,997,533
DATED     : March 5, 1991
INVENTOR(S) : Surendra K. Kawatra, Timothy C. Eisele It is certified that error appears in the above-identified patent and that said Letters Patent is hereby corrected as shown below:

Claim 11, Column 6:

line 54, delete "pl" and "(c)" should start a new paragraph, line 57, "from" should be --for--;

line 58, after "separated" and before the ";" insert --therefrom--;

line 67, "(c)" should be --(e)--.

Signed and Sealed this

Twenty-first Day of July, 1992

Attest:

DOUGLAS B. COMER

*Attesting Officer*     *Acting Commissioner of Patents and Trademarks*